Dec. 5, 1961  G. F. UNGER  3,011,263
PLUMB BOB DEVICE
Filed Sept. 2, 1958
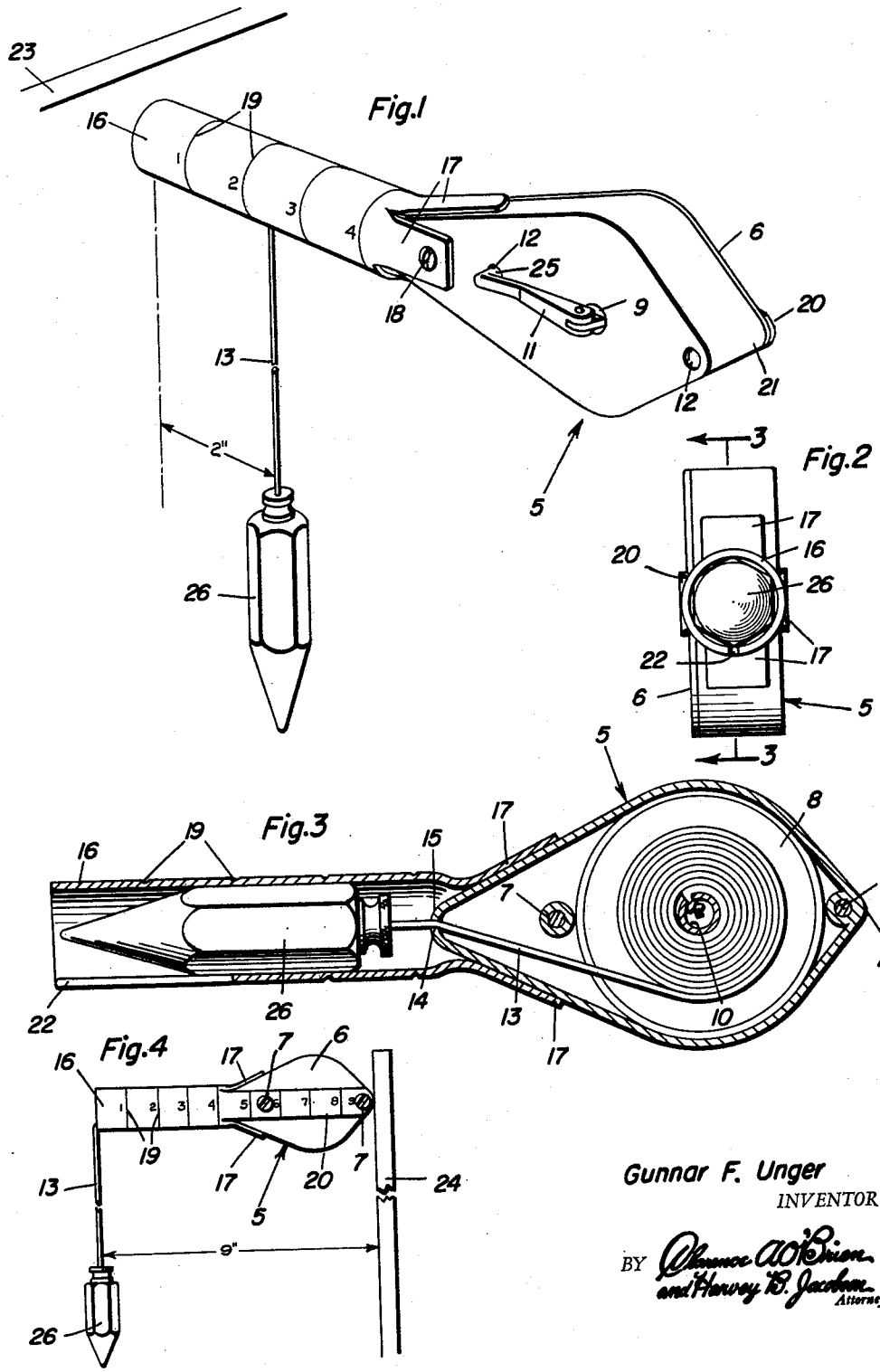
Gunnar F. Unger
INVENTOR.

Patent Office
3,011,263
Patented Dec. 5, 1961

3,011,263
PLUMB BOB DEVICE
Gunnar F. Unger, 605 Division St., Mandan, N. Dak.
Filed Sept. 2, 1958, Ser. No. 758,491
5 Claims. (Cl. 33—217)

This invention relates to new and useful improvements in plumb bob devices for use particularly, although not necessarily, by carpenters for plumbing up columns, walls, forms, etc., and has for one of its important objects to provide, in a manner as hereinafter set forth, a device of this character which may be conveniently used with but one hand, leaving the other hand free for other purposes such, for instance, as holding on when working on high structures.

Another very important object of the present invention is to provide a plumb bob device of the character described comprising novel means for spacing the line from the work for clearing obstructions such as walers and, further, for accurately indicating the distance of said line from said work.

Still another important object of the invention is to provide a device of the aforementioned character comprising means for housing the line and the bob when the instrument is not in use.

Other objects of the invention are to provide a plumb bob device of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view, showing a plumb bob device constructed in accordance with the present invention in use;

FIGURE 2 is an end elevational view of the device;

FIGURE 3 is a view in vertical longitudinal section, taken substantially on the line 3—3 of FIGURE 2; and FIGURE 4 is a side elevational view, showing another method of using the device.

Referring now to the drawing in detail, it will be seen that the embodiment of the invention which has been illustrated comprises a substantially oblanceolate case 5 of aluminum or other suitable material. The case 5 includes on one side a removable access plate or cover 6 which is secured in position by screws 7. Of course, the case 5 may be of any desired dimensions.

Rotatably mounted in the case 5 is a reel or spool 8. An opening 9 in the case 5 rotatably accommodates the shaft 10 of the spool 8. An operating crank 11 for the spool 8 is pivotally mounted on the shaft 10. Wells or sockets 12 are provided in the case 5 for the reception of the handle 25 of the crank 11 for securing the reel or spool 8 against rotation.

A plumb line 13 has one end secured to the spool 8 for winding thereon. The line 13 is slidable through an opening 14 provided therefor in the forward end or apex 15 of the case 5. Connected to the other end of the line 13 is a bob 26.

Mounted on the forward end portion of the case 5 and projecting longitudinally therefrom is a combination tubular gauge and bob housing 16 of suitable metal. The rear or inner end portion of the tubular gauge 16 is longitudinally split and spread to provide flat fingers 17 which longitudinally engage the case 5, one of said fingers being secured to said case by a screw 18. The gauge 16 is graduated or scaled in inches on both sides, as indicated at 19. As shown to advantage in FIGURE 4 of the drawing, the scale on one side of the gauge 16 includes an extension 20 integral with said gauge which extends the length of the case 5 to the base or rear end 21 thereof and is secured thereto by the screws 7. Extending into the tubular gauge 16 from the open forward end thereof is a longitudinal slot 22 for the reception of the line 13.

It is thought that the use of the instrument will be readily apparent from a consideration of the foregoing. In FIGURE 1 of the drawing, reference character 23 designates the upper portion of a column, for example, to be plumbed. To plumb the column 23, the mechanic pays out the desired length of the line 13 and engages said line in the slot 22 which, it will be observed, extends to the two inch mark on the scales 19. With a helper on the ground, the mechanic abuts the forward end of the tubular gauge 16 with the column 23. Of course, the line 13 at the top is two inches from the column 23 and if the measurement or reading taken by the helper on the ground is the same the column 23 is plumb. The line 13, being engaged in the slot 22, is spaced from the work 23. To plumb a wall form, for instance, as indicated at 24 in FIGURE 4 of the drawing where the line 13 must clear walers the base or inner end 21 of the case 5 is abutted with the work and the scale 19 which includes the extension 20 is used. When the instrument is turned over to bring this scale into use, the slot 22 is uppermost in the tubular gauge 16 and the line 13 hangs from the forward end of said gauge. When thus suspended the line 13 is 9 inches, for example, from the form 24 and a similar reading taken by the helper on the ground indicates that said form is plumb. For other situations where it may be desired to space the line 13 various distances from the work the tubular gauge 16 may be engaged at any intermediate point on top of the work. The reading or measurement taken by the helper on the ground may then be compared with either of the scales 19 on the work. When the device is no longer to be used the line 13 is rewound on the spool 8 in the case 5 and the bob 26 is drawn into the tubular gauge 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A plumbing device comprising a horizontally elongated, invertible casing engageable at one end with a structure to be plumbed, a cylindrical, longitudinal tube on the other end of the casing having communication therewith and including an open free end engageable with a structure to be plumbed, a rotary spool in the casing, a plumb line slidable through the tube into the casing and having one end connected to the spool for winding thereon, a plumb bob on the other end of the line, said tube having a slot extending longitudinally thereinto from said free end thereof, said line being selectively suspendible from the free end of the tube when the casing is engaged with the first named structure, or from the inner end of the slot when the tube is engaged with the second named structure, the free end of the tube and the inner end of the slot thus constituting suspension points for the line.

2. A plumb bob device according to claim 1, said tube having longitudinally extending scales on diametrically opposite sides indicating the distance of the suspension points from the structures.

3. A plumb bob device according to claim 2, one of said scales extending to said one end of the casing.

4. A plumb bob device according to claim 2, said slot being in the lower portion of the tube for receiving the line therein by gravity when said slot is in use and said slot, when not in use, being in the upper portion of the tube.

5. A plumb bob device according to claim 3, said slot being in the lower portion of the tube for receiving the line therein by gravity when said slot is in use and said slot, when not in use, being in the upper portion of the tube.

References Cited in the file of this patent

UNITED STATES PATENTS

| | | |
|---|---|---|
| 932,218 | Wilson | Aug. 24, 1909 |
| 1,230,074 | Perkins | June 12, 1917 |
| 2,779,045 | Harvey | Jan. 29, 1957 |

FOREIGN PATENTS

| | | |
|---|---|---|
| 287,057 | Germany | Sept. 11, 1915 |